UNITED STATES PATENT OFFICE.

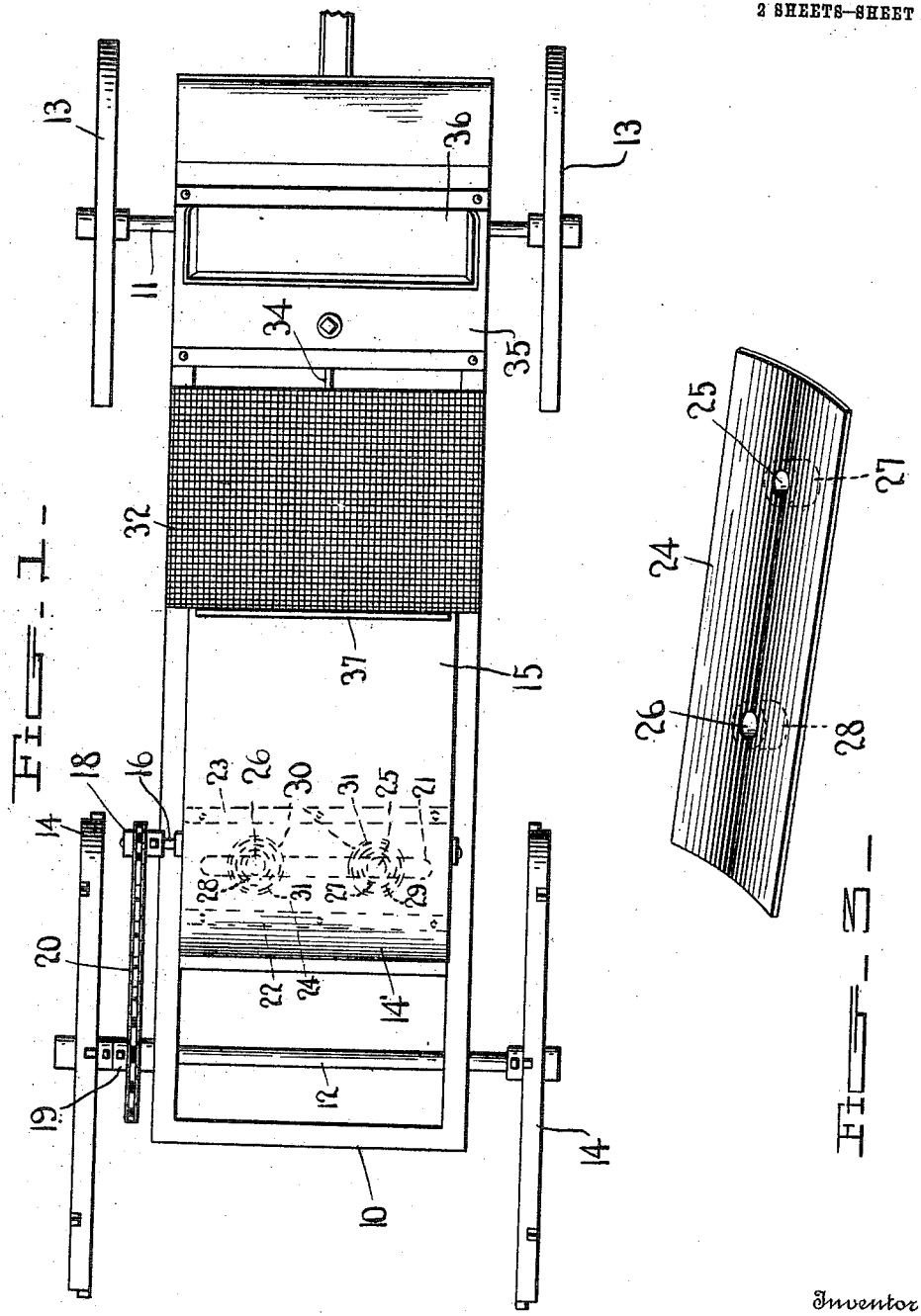

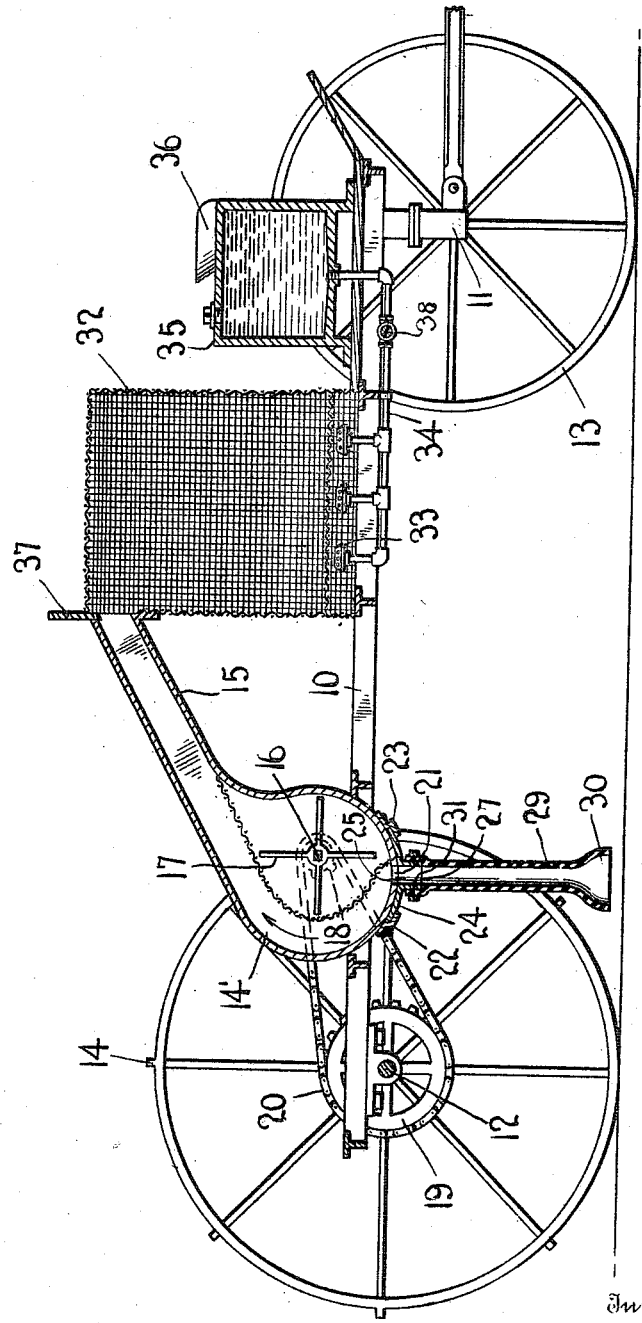

ADA MEEK, OF BURLESON, TEXAS.

INSECT-COLLECTING MACHINE.

986,193.

Specification of Letters Patent.

Patented Mar. 7, 1911.

Application filed March 28, 1910. Serial No. 551,951.

*To all whom it may concern:*

Be it known that I, ADA MEEK, a citizen of the United States, residing at Burleson, in the county of Johnson, State of Texas, have invented certain new and useful Improvements in Insect-Collecting Machines; and I do hereby declare the following to be a full, clear, and exact description of the invention, such as will enable others skilled in the art to which it appertains to make and use the same.

This invention relates to insect collecting machines and is particularly adapted for removing diseased forms or squares of the cotton plant which have been attacked by the boll weevil.

The object of the invention is to produce a machine designed to be propelled by draft animals, equipped with a suction apparatus operated by the movement of the machine to collect the insects and infected plant forms or squares.

Another object of the invention is to equip an apparatus of the character specified with detachable suction tube supports, said suction tube supports being adapted to carry the suction tubes disposed at different distances apart so as to allow for the difference in width of the rows of plants upon which the machine is operating.

A still further object of the invention is to provide a receptacle into which the insects and infected plant forms are deposited and in supplying said receptacle with a plurality of burners arranged directly beneath the base of said receptacle so that insects and diseased plant forms falling thereupon will be immediately destroyed.

With the above and other objects in view the invention consists in the details of construction and in the arrangement and combination of parts to be hereinafter more fully described and set forth in the claim.

In describing the invention in detail reference will be had to the accompanying drawings wherein like characters of reference denote corresponding parts in the several views, and in which, Figure 1 is a top plan view of a machine constructed in accordance with the invention; Fig. 2, a longitudinal section of same; and, Fig. 3, a detail view of one of the detachable suction tube supports.

Referring to the drawings, the machine is shown as comprising a frame 10 provided with front and rear axles 11 and 12 respectively. Mounted upon the front axle 11 are traction wheels 13, while traction wheels 14 are mounted on the rear axle 12. Supported upon the frame 10 just inward of the rear axle 12 is a vacuum chamber which is formed of a casing having a substantially cylindrical body portion 14' and a delivery spout 15. Journaled between the sides of the vacuum chamber is a shaft 16 which has mounted thereon for rotation therewith a suction fan 17. The shaft 16 projects through the casing of the vacuum chamber at one side and has mounted on its projecting end a sprocket wheel 18 while another sprocket wheel 19 is mounted on the rear axle 12 in longitudinal alinement with the sprocket wheel 18. A sprocket chain 20 is mounted for travel on the sprocket wheels 18 and 19 and serves to rotate the shaft 16 and the fan 17 as the machine is drawn along the ground.

The lower side of the body portion of the casing of the vacuum chamber is provided with a transverse aperture 21 upon each side of which are mounted transverse guide rails 22 and 23 respectively adapted to detachably secure the suction tube support 24 to the casing. The support 24 is provided with apertures 25 and 26 which are surrounded respectively with the projecting cylindrical flanges 27 and 28. It will of course be understood that the flanges 27 and 28 and the apertures 25 and 26 are located a distance apart corresponding to the distance between the rows of plants upon which the machine is operating. A number of the supports 24 are designed to be supplied to each machine, the apertures through each of which are separated by varying distances whereby the machines may be readily accommodated to the work at hand by applying a support, the apertures of which are separated by a distance substantially equivalent to the distance between the rows of plants. Detachably secured to the flanges 27 and 28 are suction tubes 29, the lower end of which is flared to produce an enlarged mouth 30. These suction tubes are preferably constructed of a flexible material such as rubber, and are adapted to be attached to the flanges 27 and 28 by sliding said tubes at their upper ends over respective flanges and locking same thereon by means of a compression ring 31 slid over the outer faces of the tubes so as to bind the latter between said rings and outer faces of the respective flanges.

Supported upon the frame 10 forward of the vacuum chamber so that the spout 15 empties therein is a screened receptacle 32 into which the insects and diseased plant forms are adapted to be deposited. Disposed beneath the base of the receptacle 32 is a series of burners 33 which are connected by a pipe 34 with a fuel supply tank 35 supported approximately over the front axle 11 and constituting a support for a seat 36. The supply of fuel from the tank 35 to the burners 33 is controlled by a valve 38 disposed in the pipe 34. The mouth of the spout 15 is closed by a sliding gate 37 so as to nullify the action of the suction apparatus when desired.

From the foregoing description it is believed that the operation of the machine will be apparent it being only necessary in order to institute the actuation of same to first ignite the burners 33 and then lift the gate 37 when the propulsion of the machine will suck the insects and diseased forms from the plants over which the tubes 29 pass and deposit same in the screen receptacle 32 where they will be immediately consumed by the heat from the burners 33.

It will of course be understood that should the distance between the rows of plants being operated upon vary with respect to the openings in the support 24, said support may be readily detached and another supplied in which the distance between its openings conform to the distance between the rows of plants.

What is claimed is:

In a machine of the character described, the combination with a vehicle, a receptacle, a casing provided with an aperture in the wall thereof, a suction tube support detachably secured to said casing and provided with a plurality of apertures disposed within the limitations of the aperture in the casing when the support is secured thereto, a flange surrounding each aperture of the support, a suction tube having its upper end telescoping with and disposed exteriorly of each flange, a compression ring for detachably securing each suction tube to its respective flange, and a suction device for drawing insects and infected vegetation through said suction tubes and casing and depositing same in the receptacle.

In testimony whereof, I affix my signature, in presence of two witnesses.

ADA MEEK.

Witnesses:
G. W. DOBSON,
D. W. MEEK.

---

Copies of this patent may be obtained for five cents each, by addressing the "Commissioner of Patents, Washington, D. C."